(12) United States Patent
Le Peuvedic

(10) Patent No.: US 9,444,391 B2
(45) Date of Patent: Sep. 13, 2016

(54) PROTECTIVE MODULE AND METHOD AGAINST TORQUE PEAKS BETWEEN A MOTOR AND AN ELECTRIC MACHINE

(71) Applicant: DASSAULT AVIATION, Paris (FR)

(72) Inventor: Jean-Marc Le Peuvedic, Suresnes (FR)

(73) Assignee: DASSAULT AVIATION, Paris (FR)

( * ) Notice: Subject to any disclaimer, the term of this patent is extended or adjusted under 35 U.S.C. 154(b) by 0 days.

(21) Appl. No.: 14/495,445

(22) Filed: Sep. 24, 2014

(65) Prior Publication Data

US 2015/0084565 A1    Mar. 26, 2015

(30) Foreign Application Priority Data

Sep. 26, 2013  (FR) ..................... 13 02237

(51) Int. Cl.
*H02P 6/10* (2006.01)
*H02P 29/02* (2016.01)
*F01D 15/10* (2006.01)
*F02C 7/32* (2006.01)

(52) U.S. Cl.
CPC ............... *H02P 29/02* (2013.01); *F01D 15/10* (2013.01); *F02C 7/32* (2013.01); *F05D 2220/76* (2013.01); *F05D 2270/335* (2013.01); *Y02T 50/671* (2013.01)

(58) Field of Classification Search
CPC ......... H02P 11/00; H02P 27/04; F02N 11/04
USPC ............ 318/400.01, 400.14, 400.15, 400.23, 318/400.42, 140, 152, 153, 154, 155, 156, 318/157, 158, 159, 700, 701, 715, 721, 722, 318/727, 689, 778, 779, 799, 800, 801, 430, 318/432, 400.21, 400.22; 363/56.03, 56.05, 363/56.07, 56.1, 56.11, 40, 44, 95, 174, 363/175, 81; 361/272; 388/800
See application file for complete search history.

(56) References Cited

U.S. PATENT DOCUMENTS

| 4,692,671 A | * | 9/1987 | Dishner | .................... F02C 7/32 |
| | | | | 290/4 C |
| 4,868,406 A | * | 9/1989 | Glennon | ................. F02N 11/04 |
| | | | | 290/4 R |

(Continued)

FOREIGN PATENT DOCUMENTS

| DE | 10 2010 029299 A1 | 12/2011 |
| EP | 2 415 991 | 2/2012 |

(Continued)

OTHER PUBLICATIONS

EP Search Report for corresponding EP application EP 2 853 693.

*Primary Examiner* — Antony M Paul
(74) *Attorney, Agent, or Firm* — Davidson, Davidson & Kappel, LLC

(57) ABSTRACT

A protective method is provided against torque peaks between a motor adapted for setting a shaft of the motor into rotation and an electric source adapted for electrically powering an electric assembly and including a fixed section and a rotating adapted for rotating with the shaft. The method includes a step for controlling the operation of the electric source forcing the rotary movement of the rotating section with the shaft to observe an instruction relating to the torque of the rotating section applied to the shaft of the motor, the instruction being adapted depending on at least one element characterizing a current operating state of the motor.

17 Claims, 1 Drawing Sheet

(56) References Cited

U.S. PATENT DOCUMENTS

| | | | |
|---|---|---|---|
| 5,770,909 A * | 6/1998 | Rosen | H02K 11/042 310/113 |
| 7,298,102 B2 * | 11/2007 | Sopko | B60K 6/46 318/139 |
| 7,745,950 B2 | 6/2010 | Lueck | |
| 2003/0178973 A1 | 9/2003 | Maehara | |
| 2007/0021267 A1 | 1/2007 | Obayashi et al. | |
| 2008/0157539 A1 | 7/2008 | Tani et al. | |
| 2012/0130597 A1 | 5/2012 | Aoyagi | |
| 2013/0093366 A1 | 4/2013 | Nakajima et al. | |
| 2013/0234506 A1 | 9/2013 | Langford et al. | |
| 2014/0225575 A1 | 8/2014 | Andrejak et al. | |

FOREIGN PATENT DOCUMENTS

| | | |
|---|---|---|
| FR | 2968716 A1 | 6/2012 |
| FR | 2979767 A1 | 3/2013 |
| FR | 2981525 A1 | 4/2013 |

* cited by examiner

PROTECTIVE MODULE AND METHOD AGAINST TORQUE PEAKS BETWEEN A MOTOR AND AN ELECTRIC MACHINE

This claims the benefit of French Patent Application FR 13 02237, filed Sep. 26, 2013 and hereby incorporated by reference herein.

The present invention relates to a protective method against torque peaks in a system comprising an electric assembly including one or more electric loads, a motor suitable for setting a motor shaft into rotation, an electric source comprising at least one electric machine and suitable for electrically powering the electric assembly, said electric source including a fixed section and a rotating section adapted for interdependently rotating with the shaft.

Such systems are for example positioned in aircraft. Upon sudden variations in the electric power needs of electric loads for example, the electric machine, for example including one or more very strong power alternators, sometimes imposes torque peaks to the shaft of the motor which may damage or weaken certain elements of the motor.

BACKGROUND

Document EP 2 415 991 proposes a mechanical solution according to which a conical clutch is positioned between the electric machine and a relay of accessories of the motor. By acting on the speed of the shaft of the motor driving the electric machine, this solution may further cause large frequency and voltage deviations of the electric power supply provided to the electric assembly relatively to the standard when the electric machine tries to extract strong power at low speed of the motor, and the clutch slips. The non-linearity of the solution and the frequency deviation do not allow optimization of the power extracted from the relay of accessories.

Document U.S. Pat. No. 7,745,950 proposes adding a free turbine dedicated to electrically generating strong power capable of starting the motor by means of a clutch towards the high pressure shaft. This solution has the drawback of extensively modifying the architecture of the motor, requiring lengthening of the motor which may cause lengthening of the aircraft itself. Further, the additional mass is not negligible.

SUMMARY OF THE INVENTION

The present invention aims at proposing a protective solution against torque peaks.

For this purpose, according to a first aspect, the invention proposes a protective method against the torque peaks of the aforementioned type characterized in that it includes a step for controlling the operation of the electric source forcing the rotary movement of the section rotating with the shaft to observe an instruction relating to the torque of the rotating section applied to the shaft of the motor, said instruction being adapted according to at least one element characterizing a current operating state of the motor.

This solution gives the possibility of optimizing the power extracted from the motor by the electric machine by adapting it to the state of the motor, for example to the speed of rotation of the motor, thereby giving the possibility of taking into account that the torque for providing electric power decreases when the speed of rotation of the motor increases and therefore not unnecessarily limiting electric production during normal flight conditions.

In embodiments, the protective method against torque peaks according to the invention further includes one or more of the following features:
said instruction depends on at least one element characterizing a current operating state of the motor from among the speed of rotation of the shaft of the motor, an air compression rate in the motor, a calculated indicator of the capability of accepting a withdrawal by the motor, a fuel output relating to the motor, a variation threshold of the taken torque I calculated by the motor;
the instruction sets at least one threshold value selected from a maximum torque threshold value, a minimum torque threshold value, a maximum torque variation rate threshold value and a minimum torque variation rate threshold value;
the control comprises the determination of an electric signal to be applied to the rotating section or to the fixed section of the electric source, and comprises the application of said signal to said rotating or fixed section;
said electric signal is an alternating voltage applied by an active rectifier;
the control comprises the determination of the phase and/or of the amplitude of said electric signal;
a plurality of pieces of equipment from among the electric source and the loads are controlled so as to each observe a curve relating the voltage on the terminals of the piece of equipment to the current flowing through the piece of equipment, having a first area with a current plateau for voltage values in a range comprising a minimum operating voltage, a second area in which the current decreases when the voltage increases beyond said range, and a third area with a current plateau for voltage values beyond the second area.

According to a second aspect, the present invention proposes a protective module against torque peaks intended for a system comprising an electric assembly including one or more electric loads, a motor adapted for setting a shaft of the motor into rotation, an electric source comprising at least one electric machine and adapted for electrically powering the electric assembly, said electric source including a fixed section and a rotating section adapted for rotating interdependently with the shaft, said protective module being adapted, in order to control the operation of the electric source or by forcing the rotary movement of the rotating section with the shaft to observe an instruction relating to the torque of the rotating section applied to the shaft of the motor, said module being characterized in that it is adapted for determining an element characterizing a current operating state of the motor, and for further adapting said instruction according to at least said element.

BRIEF SUMMARY OF THE DRAWINGS

These features and advantages of the invention will become apparent upon reading the description which follows, only given as example, and made with reference to the appended drawings, wherein.

DETAILED DESCRIPTION

Figure 1:
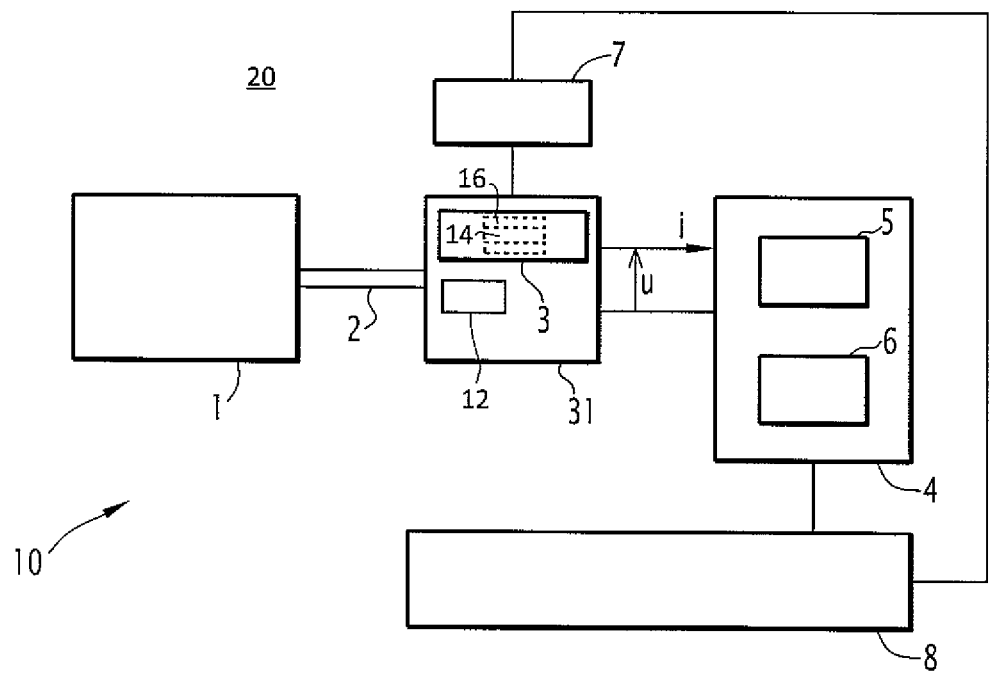
FIG. 1 illustrates a system in an embodiment of the invention.

In FIG. 1, a system 10 in an embodiment of the invention is illustrated.

The system 10 includes a motor block 1, a so-called motor 1, an electric source 31 and an electric network 4.

The electric source 31 includes an electric machine 3, and optionally an active or passive rectifier 12.

In the relevant embodiment, the system 10 is loaded on board an aircraft 20, for example including several motors similar to the motor 1, themselves connected to electric machines.

The system 10 further includes a controller of an electric machine 7 and an energy management block 8 connected to the electric machine controller 7.

The motor 1 comprises a shaft 2 and is adapted for driving the shaft 2 into rotation according to a speed of rotation called the speed of rotation of the motor.

In an embodiment, the motor 1 for example comprises a relay of accessories, an air compression section, a compressed air and fuel combustion section and a turbine section fed by the gases from the combustion and producing mechanical energy for driving the shaft 2.

The electric source 31, comprising the electric machine 3, for example an alternator, comprises a mobile section, called a rotor 14, interdependently engaged into rotation with the shaft 2 of the motor 1 and a fixed section 16, called a stator, delivering an electric power supply, characterized by an electric voltage u and an electric current i, to the electric network 4. For example the power range of the alternator is from 50 kW to 75 kW.

It will be noted that in an embodiment, several electric machines may be driven by the motor 1, in order to electrically power the electric network 4 and if necessary the electric networks of the aircraft.

The electric network 4 comprises a set 5 of load(s) adapted for consuming electric current, and optionally one or several electric power supply sources 6 other than the electric machine 3 (for example other electric machines driven by the motor 1 or by another motor). It will be noted that the electric network 4 includes in certain cases one or several batteries, each battery being considered as a load 5 or as a source 6 depending on its condition.

The term <<equipment>> will designate below electric equipment of the electric source or electric load types of the system 10.

The energy management block 8 is adapted for balancing the demands for electric power of the loads, and providing electric power from the energy sources comprising the electric machine 3 and the sources of the electric network 6, including the batteries, on the scale of the system and more generally of the aircraft, notably when a portion of the electric generation becomes unavailable (motor failure, electric failure) or when the demand for electric power increases a lot.

In an embodiment of the invention, the management of the energy present on the system 10 and more globally on the aircraft comprises two components:

a distributed component, without any central coordination, which manages off-loading (i.e.; stopping their short-term electric consumption of the main loads), the contribution of each source and ensures an anti-overvoltage function; this distributed component is for example applied by equipment controllers;

a centralized component which ensures the maintaining of the objective of charging batteries in the medium/long term, the adjustment of the voltage level u of the network 4, the commissioning and stopping of secondary electric sources such as APU and suitability of the generation capacity with the medium/long term needs of the loads of the electric network 4; this centralized component is for example applied by the energy management block 8 or by distinct modules connected to the energy management block 8.

The centralized energy management component collects the data representative of the electric configuration of the electric network 4 at each instant, and anticipates on its possible developments which may result in the triggering of electric protections.

Description of the Distributed Energy Management Component:

On each distinct portion of the electric network 4 (dedicated frost protection network, right network, left network), the electric voltage is left to develop freely depending on the load of the network.

The loads which may cause short-term offloading (for example the frost protection function, for which the characteristic time is of at least one second) are controlled like the parallel association of a load of constant impedance and a source. The source is normally at zero but if the voltage drops a lot, it will virtually contribute to providing the required power. For loads of the <<on or off>> type, only a voltage threshold is programmable with hysteresis for avoiding instability due to simple disconnection of the load. For alternators and more flexible loads, there may be a gradual reduction of the consumed power.

Figure 2:
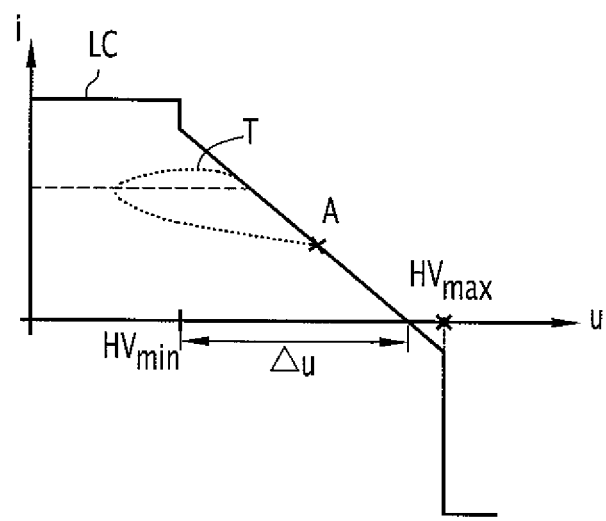
FIG. 2 illustrates the current-voltage law of an alternator in an embodiment of the invention.

The alternators each have a determined current-voltage characteristic LC illustrated in solid lines in FIG. 2: this characteristic causes overload of the alternator (normal overload if this is allowed) when the voltage approaches the minimum authorized value $HV_{min}$.

This electric characteristic, referenced as LC in FIG. 1, applied by an alternator, was defined beforehand by programming the energy management block 8 and is applied by driving the alternator with the controller 7.

The invention as an object explained further on, however allows the alternator 3 to transiently ignore this characteristic under certain conditions without this being associated with an electric generation failure.

When the voltage u of the network 4 attains the authorized minimum, all the sources powering the network 4 are at their maximum power (potentially that of the short-term overload), and all the loads which may be shedded and are in good operating condition, may be temporarily shedded. The power crossing the fault is maximum which allows the protections, fuses and contactors to be operated selectively. Each alternator and each load adjusts over time its consumption for protecting itself, by trying to give up maximum power to the network 4.

Conversely, when the voltage u of the network 4 increases abnormally (for example because of an electric generation fault or because of a regenerative load 5 alone on the network 4) until it attains $HV_{max}$, the alternators reduce the provided power, down to zero, if they are capable of doing this, inject the excess power into the driving shaft.

The extent indicated by Au in FIG. 2 represents the <<normal>> voltage range, here 250-280V, in which the sources do not start to regenerate. In this range, the sources share the power to be provided, which may be zero.

The loads which are capable of doing this (frost protection) may start by themselves to briefly consume in order to avoid overvoltage. They do this gradually at different voltage thresholds. In order that this protection operates, the components must react within a few tens of microseconds. This protection may be required when a big load is suddenly disconnected. It only acts for a few thousandths or hundredths of a second, the time required for the electric generation to regulate its power.

Each electric network has at least one alternator capable of causing regeneration in the driving shaft with sufficient power in order to compensate for the regulation failure of another alternator, and a high power frost protection element which may check any overload related to the reversibility of the network.

The distributed energy management component gives the possibility of stabilizing and anticipating the reaction of the electric network to unpredictable time-dependent changes in loads, even if they result from pieces of equipment not integrated into the energy management (low-power or high priority equipment like actuators for flight commands), or from unpredictable failures.

The parameters of the distributed energy management component specific to each piece of equipment are adjusted by the centralized energy management component, such as:
  threshold voltage for switching to maximum power (source), or to maximum off-loading (load);
  maximum power provided when the voltage is above the threshold;
  voltage at which the source does no longer provide any power, or at which the load is no longer shedded at all;
  threshold voltage at which a reversible source or a specific load will massively intervene for avoiding an overvoltage.

Thus, the general form of the current/voltage characteristic for each piece of equipment is similar to the law for the alternator of FIG. 2.

Description of the Centralized Energy Management Component:

The centralized energy management component optimizes the operation of the electric network 4 by achieving management of sources with a horizon of a few minutes, and by periodically adjusting the parameters of the characteristics of the different sources and of the main loads.

From now on, it should be noted that, even if the selected parameters are very bad parameters, they should be validated by the sources, and the latter will therefore always deliver the power required for the loads at a voltage belonging to the normal range from 250 to 280 V. Under normal conditions, this component provides the positioning of the voltage u as close as possible to the level of 280 V in order to minimize the current, and maximize the yield (in particular alternators are strongly demagnetized so as to provide 270 V, and authorizing higher voltage directly increases their yield).

In an embodiment of the invention, the electric machine controller 7 is adapted for storing at least one instruction for regulating the torque peaks. This instruction depends on the current value of pieces of information characterizing the state of the motor 1. The electric machine controller 7 is further adapted for regularly collecting the current value of the pieces of information characterizing the state of the motor 1, and for determining, depending on this current value, the applicable instruction for regulating the torque peaks. The electric machine controller 7 is further adapted for controlling the operation of the alternator 3 so that the alternator operates while observing the determined instruction.

The information characterizing the state of the motor for example comprises:
  the speed of rotation of the shaft 2 of the motor 1; and/or
  the current capability of the motor 1 of absorbing a torque peak in a given time window; for example in one embodiment, the motor directly indicates the variation of the mechanical power withdrawal which it may accept, to be interpreted according to an agreed timescale during the design phase, this timescale giving the possibility of differentiating this phenomenon from a vibration; and/or
  the air compression rate in the motor;
  a fuel flow rate relating to the motor;
  a taken torque variation calculated by the motor.

The instruction determined by the electric machine controller 7 in an embodiment imposes a maximum torque value (the torque being considered in absolute value) and/or a maximum value of the torque variation rate (the variation rate being considered in absolute value), depending on these pieces of information characterizing the current state of the motor 1.

It will be noted that additionally, the maximum torque is set by the horizontal portion before $HV_{min}$ of the law illustrated in FIG. 2 which limits in all the cases the power to a certain level. In an embodiment, each alternator and each load is adapted for adjusting over time its production or its consumption so as to protect itself, while trying to give up the maximum power to the network 4. In an embodiment, the power taken by the alternator on the driving shaft is dynamically adjusted by the latter depending on information from the motor, in order to ensure durability of the energy supply.

For example, in an embodiment:
  when the speed of rotation is greater than a threshold $w_{max}$, no restriction as to the torque value or to the torque variation rate is imposed; and
  when the speed of rotation is less than the threshold $w_{max}$, the instruction comprises the indication of limiting the torque to a maximum torque value $\Gamma_{max}$, which optionally depends on the speed of rotation and/or the instruction comprises the indication of limiting the torque variation rate to a maximum torque variation value $d\Gamma_{max}$, which optionally depends on the speed of rotation.

The electric network 4 may be assimilated to a capacitor. Its voltage u is regulated by servo-controlling the current i which arrives on the network 4 so that the voltage u is set, for example by means of a proportional-integral-derivative controller.

The current is subordinated to an objective computed current value, which depends on the voltage of the network. In a narrow range of <<normal>> voltages [$HV_{min}$, $HV_{min}$+$\Delta u$]=[250-280V] DC), the current-voltage characteristic of the alternator 3 imposes that the alternator passing from full load to zero load, which guarantees the existence of an equilibrium point in this voltage range from the moment when the electric generation capability managed by means of the energy management function is sufficient for covering the needs. This is not sufficient for guaranteeing the stability of the network at this equilibrium point, in particular when there are several sources. Indeed, the unbalances between supply and demand lead to extremely rapid variations of the voltage of the network. For unit powers of less than 100 kW and typical loads, the order of magnitude of 1 ms of regulation time is sufficient for ensuring the stability of the voltage regulation with a reasonable amount of capacitors.

In an embodiment of the invention, the electric machine controller 7 is adapted, when the speed of rotation w of the shaft is less than the threshold $w_{max}$ for example, for controlling the operation of the alternator 3 so that the latter applies, ignoring the usual operating characteristic of the alternator illustrated in solid lines in FIG. 2 and only when the speed of rotation is less than $w_{max}$, the operating characteristic corresponding to the additional portion illustrated in dashed lines in FIG. 2. This saturation of the power of the alternator 3 corresponds to an instruction for limiting the torque. If the network 4 requires electric power such that the voltage attains a voltage corresponding to this dashed line portion, the energy management function will increase the contribution of electric sources 6 other than the alternator 3 until an operating point on the dashed line portion is again attained by the alternator 3.

If the variation of electric power demanded by the network 4 exceeds what the alternator 3 may deliver within 1 ms, while observing the instruction for limiting the torque variation, the alternator 3 will take more time to reach its operating point on the solid line portion.

The transient conditions begin after one millisecond, a timescale at which the unbalances between production and consumption of electricity are no longer hidden by the capacity of the network. The distributed energy management function will ensure that another source available on the same electric network 4 ensures the energy supply potentially by a short-term overload (it is considered that these conditions may typically last for 0.5 s). As the alternator 3 gradually moves towards its equilibrium point, the other source gradually reduces its contribution.

The sharp shift in the reaction time scales of the different sources is also a known way for ensuring that the equilibrium point is attained in a stable way.

In an embodiment of the invention, the electric machine 3 is of the alternator type with magnets. The electric source 31 then comprises an active rectifier suitable for forcing said alternator with magnets to apply the instruction relating to the torque.

For example, the alternator with permanent magnets comprises coils wound on the stator and the active rectifier is adapted for applying to these coils of the alternator an alternating voltage for which the phase and amplitude values may be adapted and are determined depending on the instruction to be relatively applied to the torque. Both of these degrees of freedom give the possibility of adjusting independently the values of the voltage u of the network 4 and of the magnetic flux circulating in the alternator 3.

The product of the speed of rotation and of the flux of the alternator is proportional to the electromotive force. Multiplied by the output current or the current produced by the alternator, the latter force represents during normal operation the quasi totality of the mechanical power required by the alternator 3. As the alternator 3 is subject to an imposed speed of rotation, by controlling the flux it is possible to compensate for the variations of the latter by stabilizing the electromotive force. When the alternator is driven at great speed, a current-voltage phase shift gives the possibility of having demagnetizing currents flowing in a short circuit between the active rectifier and the alternator, which reduce the flux. These currents may be significant even if the exchanged currents i with the edge network are small.

Both mentioned degrees of freedom may therefore be expressed by distinguishing the current exchanged between the rectifier and the alternator and the current exchanged between the rectifier and the network 4, which may be controlled independently, one for adapting to changing and imposed mechanical driving conditions and the other for adapting to variable energy consumption on the electric network.

Thus, by adapting the phase value of the alternating voltage, it is possible to reduce the torque peaks applied by changes in electric loads, according to which the current i varies, therefore the torque varies (indeed, as the power is the product of the speed of rotation by the flux and by the current, the product of the flux by the current is proportional to the torque (the torque-speed product is also equal to the power). In a control example, the phase is controlled by a vector command. The exchanged powers, orthogonally broken down into an active power (which is the one exchanged with the network 4) and a reactive power (used for regulating the flux) are independently adjusted with the active rectifier.

And by adapting the amplitude value of the alternating voltage, it is possible to control the voltage of the network 4 so as to compensate for the changes in load of the network 4 and thus reduce the torque peaks between the alternator 3 and the shaft 2 due to the load changes of the network 4, while observing the characteristic illustrated in dashed lines in FIG. 2. For example, if $w<w_{max}$, the amplitude of the alternating voltage of the active rectifier is controlled in order to guarantee observance of the characteristic illustrated in dashed lines in FIG. 2, in a torque limitation example.

In a torque variation limitation example, the time-dependent change of the voltage and current for limiting the torque variation when the demand for current suddenly increases, would look like the curve T illustrated in FIG. 2 with dotted lines.

Thus, starting from point A to reach a power level materialized by the dotted line, the value of the current has increased, not as fast as would have been necessary, while the voltage drops since the sources do not deliver enough current. The current reflecting the torque continues to increase in a controlled way and when it exceeds the equilibrium threshold, the voltage starts to rise again. Next, the system finds a new equilibrium point placed on the LC curve illustrated in solid lines.

It will be noted that the regulation of the operation of the alternator 3 by an active rectifier allows a regulation of the order of 1 ms since the use of the active rectifier gives the possibility of going against the effect of the inductance exhibited by the alternator, by short-circuiting it. If oscillations occur, they will be strongly damped when the current i decreases which ensures fast convergence.

Thus according to the invention, the torque between the rotating section of the electric machine 3 and the shaft 2, which rotates interdependently (optionally through a relay of accessories which allows the speed to be adapted by applying a fixed ratio and physically offsetting the shaft), is controlled (the value of the torque is limited when it becomes excessive or varies too rapidly) so as to provide the required electric power.

A method according to the invention allows acceptance of higher torque values than those in the solution described in EP 2 415 991, and combines in the instructions setting maximum torque values and torque value variations, what a purely mechanical system cannot do. It adapts to the state of the motor, for example to the speed of rotation of the motor, thereby giving the possibility of taking into account the fact that the required torque for providing electric power decreases when the speed of rotation of the motor increases and not unnecessarily limiting the electric production during normal flight conditions.

The solution of EP 2415991 limits the torque to a set maximum value. This limit corresponds to power proportional to the speed and it has to be placed sufficiently high so that the system may deliver the required power under low-speed conditions. When the set value is proportional to the reciprocal of the speed, the device may be used for limiting the power instead of only limiting the torque.

In another embodiment, the electric machine 3 is an alternator with a wound rotor, and the invention is applied by means of an electric machine 7 controller of the Generator Control Unit type, called a GCU, adapted for controlling the flux in the wound rotor of the alternator. The speed of rotation is always imposed, but the value of the flux is adapted by acting on the current of the rotor via the excitation circuit, powering the coil of the rotor (it is sufficient to change its voltage in order to change the current flowing in the coil of the rotor, and therefore the flux). Normally, it is not necessary to introduce a direct current component used for reducing the flux via the stator, which allows the use of a simple diode rectifier, or direct use of alternating current.

A simple diode rectifier imposes a higher harmonic level than an active rectifier with transistors in the current waveforms flowing in the stator. The losses are therefore a little higher.

In this implementation, the GCU is responsible for voltage regulation or current-voltage regulation of the network 4 according to the energy management discussed above. For this, it measures the voltage of the regulation point according to FIG. 2, applies regulation (typically a proportional-integral-derivative controller), which acts on the excitation.

There exist more advanced GCUs which may react more rapidly to changes in load or in driving speed depending on a measurement of the excitation current and of the current of the stator.

The mechanical torque produced by the alternator associated with a GCU controller 7 is proportional to the product of the current at the stator and of the flux, which is controlled by the excitation. The GCU controller 7 may therefore limit this torque by acting on the flux, and limit the torque variation by acting on the variation of the flux. The relatively high inductance of the excitation circuit ensures that the variation of the flux is quite naturally limited, but a sudden demand for power causes a voltage drop which increases the current. In this scenario, the GCU 7 is adapted for initially lowering the flux for controlling the torque variation, and then for gradually increasing it up to the required level in order to have the required voltage at the new power level.

It will be noted that in the case of a controller 7 acting on the flux of a wound rotor, the controller 7 is connected to the electric source 31, as illustrated in FIG. 1. In the case of a controller 7 controlling an active rectifier of the electric source 31, the controller 7 is generally physically integrated to the active rectifier.

It will be noted that the different embodiments presented above may be combined with each other.

In the embodiment described with reference to the figures, the electric machine is an alternator with a wound rotor and the electric network is an AC network. Nevertheless, the invention may be applied with any type of electric machine, for example with an electric machine of the alternator type with permanent magnets, an asynchronous induction machine which in an embodiment will be driven by an active rectifier, with a synchronous multiphase machine: the variations in the driving speed and the load variations are compensated with 2 degrees of freedom as described above.

The work leading to his invention received subsidies from the seventh European Community framework program (FP7/2007-2013) for the Joint Technology Initiative Clean Sky on the basis of the Grant Agreement no. CSJU-GAM-ED-2008-001.

What is claimed is:

1. A protective method against torque peaks in a system comprising an electric assembly including one or more electric loads, a motor adapted for setting a shaft of the motor into rotation, an electric source comprising at least one electric machine and adapted for electrically powering the electric assembly, the electric source including a fixed section and a rotating section adapted for rotating with the shaft, the method comprising:

controlling the operation of the electric source forcing the rotary movement of the rotating section with the shaft to observe an instruction relating to a torque of the rotating section applied to the shaft of the motor, the instruction being adapted depending on at least one element characterizing a current operating state of the motor.

2. The protective method against torque peaks as recited in claim 1 wherein the instruction depends on at least one element characterizing a current operating state of the motor from amoung a speed of rotation of the shaft of the motor, an air compression rate in the motor, an indicator of the capability of accepting a power withdrawal calculated by the motor, a fuel flow rate relating to the motor and a withdrawn torque variation threshold calculated by the motor.

3. The protective method against torque peaks as recited in claim 1 wherein the instruction sets at least one threshold value from among a maximum torque threshold value and a minimum torque threshold value.

4. The protective method against torque peaks as recited in claim 1 wherein the instruction sets at least one threshold value from among a maximum torque variation rate threshold value and a minimum torque variation rate threshold value.

5. The protective method against torque peaks as recited in claim 1 wherein the controlling includes determining an electric signal to be applied to the rotating section or to the fixed section of the electric source, and applying the electric signal to the rotating or fixed section.

6. The protective method against torque peaks as recited in claim 5 wherein the electric signal is an alternating voltage applied by an active rectifier.

7. The protective method against torque peaks as recited in claim 5 wherein the controlling includes determining at least one of a phase and a amplitude of the electric signal.

8. The protective method against torque peaks as recited in claim 1 wherein a plurality of pieces of equipment from among the electric source and the loads is controlled so that each observes a curve relating the voltage on the terminals of the respective piece of equipment to the current flowing through the respective piece of equipment, having a first area with a current plateau for voltage values in a range comprising a minimum operating voltage, a second area in which the current decreases when the voltage increases beyond the range, and a third area with a current plateau for voltage values beyond the second area.

9. The protective method against torque peaks as recited in claim 1 wherein the motor is a turbomachine.

10. A protective module against torque peaks intended for a system comprising an electric assembly including one or more electric loads, a motor adapted for setting a shaft of the motor into rotation, an electric source comprising at least one electric machine and adapted for electrically powering the electric assembly, the electric source including a fixed section and a rotating section adapted for rotating interdependently with the shaft, the protective module comprising:

a controller adapted for controlling the operation of the electric source by forcing the rotary movement of the rotating section with the shaft to observe an instruction relating to the torque of the rotating section applied to the shaft of the motor, the controller being adapted for determining an element characterizing a current operating state of the motor, and for further adapting the instruction depending on at least the element.

11. The protective module against torque peaks as recited in claim 10 wherein the instruction depends on at least one element characterizing a current operating state of the motor from among the speed of rotation of the shaft of the motor, an air compression rate in the motor, an indicator of the capability of accepting a calculated power withdrawal by the motor, a fuel flow rate relating to the motor and a calculated withdrawn torque variation threshold by the motor.

12. The protective module against torque peaks as recited in claim 10 wherein the instruction sets at least one threshold value from among a maximum torque threshold value and a minimum torque threshold value.

13. The protective module against torque peaks as recited in claim 10 wherein the instruction sets at least one threshold value from among a maximum torque variation rate threshold value and a minimum torque variation rate threshold value.

14. The protective module against torque peaks as recited in claim 10 wherein the controller is adapted such that the controlling comprises determining an electric signal to be applied to the rotating section or to the fixed section of the electric source and comprises applying the signal to the rotating or fixed section.

15. The protective module against torque peaks as recited in claim 14 wherein the controller is adapted such that the controlling comprises determining definition data for an alternating voltage to be applied to the rotating section or to the fixed section of the electric source and providing the data to a rectifier of the electric source with view to applying the alternating voltage, by the rectifier, to the rotating section or to the fixed section of the electric source, the electric signal being an alternating voltage applied by an active rectifier.

16. The protective module against torque peaks as recited in claim 14 wherein the controller is adapted such that the controlling comprises determining at least one of a phase and of an amplitude of the electric signal.

17. An aircraft including a system comprising:
an electric assembly including one or more electric loads;
a turbomachine adapted for setting a shaft into rotation;
an electric source comprising at least one electric machine, the electric source being adapted for electrically powering the electric assembly, the electric source including a fixed section and a rotating section adapted for interdependently rotating with the shaft; and
the protective module against torque peaks as recited in claim 10.

* * * * *